United States Patent
Moulin

(10) Patent No.: US 9,699,172 B2
(45) Date of Patent: Jul. 4, 2017

(54) METHOD FOR MANAGING THE INSTALLATION OF AN APPLICATION ON AN ELECTRONIC DEVICE

(71) Applicant: SCHNEIDER ELECTRIC INDUSTRIES SAS, Rueil-Malmaison (FR)

(72) Inventor: Michel Moulin, Coublevie (FR)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 41 days.

(21) Appl. No.: 14/752,266

(22) Filed: Jun. 26, 2015

(65) Prior Publication Data

US 2016/0006722 A1    Jan. 7, 2016

(30) Foreign Application Priority Data

Jul. 4, 2014 (FR) ..................... 14 56498

(51) Int. Cl.
*H04L 29/06* (2006.01)
*G06F 21/57* (2013.01)
*H04L 9/32* (2006.01)

(52) U.S. Cl.
CPC .......... *H04L 63/0823* (2013.01); *G06F 21/57* (2013.01); *H04L 9/3247* (2013.01); *H04L 63/045* (2013.01); *H04L 63/061* (2013.01)

(58) Field of Classification Search
USPC ........ 713/156, 157, 158, 175, 169, 170, 176
See application file for complete search history.

(56) References Cited

U.S. PATENT DOCUMENTS

2007/0055881 A1* 3/2007 Fuchs ................... H04L 9/3263
  713/175
2013/0318357 A1* 11/2013 Abraham ............... G06F 21/57
  713/176

FOREIGN PATENT DOCUMENTS

EP    2402879 A1    1/2012

OTHER PUBLICATIONS

Search Report and Written Opinion dated Feb. 2, 2015 for French Patent Application No. 1456498 filed on Jul. 4, 2014.

* cited by examiner

*Primary Examiner* — Jeffrey Pwu
*Assistant Examiner* — Samuel Ambaye
(74) *Attorney, Agent, or Firm* — Oblon, McClelland, Maier & Neustadt, L.L.P.

(57) ABSTRACT

A method for managing the installation of an application on an electronic device is disclosed. In one aspect, the method includes seeking the authenticity of a second signature using the public authentication key of a certificate, the certificate being authenticated if at least one of the second sub-signatures is considered authentic during implementation of the search.

10 Claims, 6 Drawing Sheets

METHOD FOR MANAGING THE INSTALLATION OF AN APPLICATION ON AN ELECTRONIC DEVICE

CROSS-REFERENCE TO RELATED APPLICATIONS

This application claims benefit under 35 U.S.C. §119 of French Application No. 14 56498, filed Jul. 4, 2014, which is herein incorporated by reference in its entirety.

BACKGROUND

Technological Field

The described technology generally relates to a method for managing the installation of a software application on an electronic device. The described technology also relates to a method for generating a software pack and the associated computer program product. The described technology also relates to an electronic device.

Description of the Related Technology

Electronic devices are using more and more onboard applications. A programmable automaton or a circuit breaker are two examples of such electronic devices.

The onboard applications periodically require updating, in particular when improvements of the application appear or flaws are corrected. During the installation of a new version of an application on an electronic device, it is important to verify that the new version is appropriate for the electronic device in question and that the new version has been generated by an authorized company (an approved supplier or the manufacturer of the electronic device). Installing a version modified by an ill-intentioned third party may prevent the operation of the device, or worse still, make operation of the device dangerous for the user.

It is therefore desirable to update the applications of an electronic device by confidently authenticating the origin of any updates.

To that end, it is known to use electronic signatures present in the update of the application, the electronic device being provided with specific electronic signature identification capability. As an example, document EP-A-2,402,879 describes an application tool making it possible to generate a signature of the application comprising a code generator for producing a binary code, a generator generating certificates separate from the binary codes, and a platform combining at least one certificate with at least one binary code to facilitate the update of the onboard applications in an electronic device.

However, since industry is seeking to minimize operating losses, the electronic devices are updated infrequently, for example over several years of operation. As a result, when the electronic device has not been updated for some time and several versions of the application's signature have been created in the interim, the identification capability of the electronic device is only able to identify electronic signatures that have become obsolete. The aforementioned document does not make it possible to manage such a situation effectively.

SUMMARY OF CERTAIN INVENTIVE ASPECTS

There is therefore a need for a method for managing the installation of a software application on an electronic device guaranteeing a secure installation, including in the event the identification capability of electronic device is only able to identify electronic signatures that have become obsolete.

To that end, one inventive aspect is a method for managing the installation of a software application on an electronic device. The electronic device comprises a memory in which a public application authentication key and a public certificate authentication key are stored. The software pack comprises a software application comprising at least one executable code. The software pack also comprises a first authentication signature of the application obtained by asymmetrical encoding using a first private encryption key. The software pack also comprises a certificate comprising information. The software pack also comprises a second authentication signature of the certificate, the second signature being a set of at least one second sub-signature for authentication of the certificate, each second sub-signature being obtained by asymmetrical encoding each using a respective second private encryption key, at least one of the second private encryption keys being separate from the first private encryption key. The method comprises a step for seeking the authenticity of the second signature using the public authentication key of the certificate, the certificate being authenticated if at least one of the second sub-signatures is considered authentic during implementation of the search step.

The method for managing the installation of a software application on an electronic device therefore guarantees a secure installation, including in the case where the identification capability of the electronic device is only able to identify electronic signatures that have become obsolete.

According to specific embodiments, the installation method includes one or more of the following features, considered alone or according to any technically possible combination:

- at least one of the second private encryption keys is associated with the public authentication key of the certificate.
- the search step is carried out only when the first signature is considered not authentic using the public application authentication key.
- the method further comprises a step for renewing the public application authentication key of the electronic device and the public authentication key of the certificate of the electronic device.
- the information of the certificate comprises a first public key associated with the first private encryption key and the application comprises a second public key associated with a second private encryption key, the new public application authentication key obtained at the end of the renewal step being the first public key and the new public authentication key of the certificate obtained at the end of the renewal step being the second public key.
- the method further comprises a step for authenticating the application by verifying the authenticity of the first signature using the new public application authentication key.
- the installation of the application is refused when at least one of the certificate and the application is considered not authentic.

Another aspect is a method for generating a software pack comprising a step for providing an application comprising at least one executable, a first private encryption key, a certificate comprising information and at least one second private encryption key, at least one of the second private encryption keys being separate from the first private encryption key. The generating method also comprises a step for generating a first authentication signature of the application using an asymmetrical encoding using the first private encryption key, and a step for generating a second authentication signature of the certificate, the second signature being a set of at least one second sub-signature for authenticating the certificate, the step for generating the second signature comprising obtaining each second sub-signature by using asymmetrical encryption using a second respective private encryption key.

Another aspect is a computer program comprising software instructions which, when the software instructions are executed by a computer, implement a generating method as previously described.

Another aspect is an electronic device comprising a memory in which a public certificate authentication key and a public application authentication key are stored, the public authentication key of the certificate and the public application authentication key being separate.

BRIEF DESCRIPTION OF THE DRAWINGS

Other features and advantages of the described technology will appear upon reading the following description of embodiments, provided as an example only and in reference to the drawings, which are.

DETAILED DESCRIPTION OF CERTAIN INVENTIVE EMBODIMENTS

By convention, in the rest of the description, a module is to be understood in the sense of encompassing one or more software/hardware elements and having input(s), output(s) and a functionality.

Figure 1:
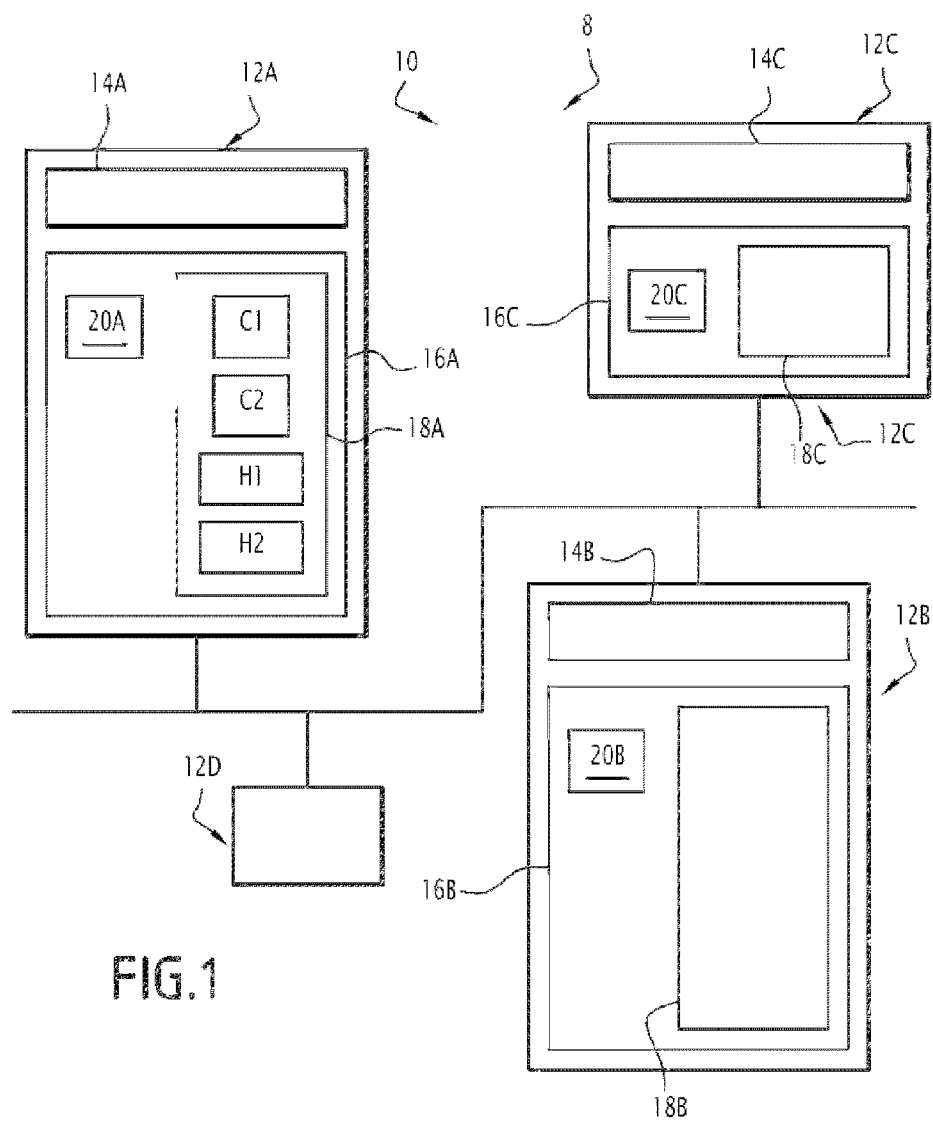
FIG. 1, a diagrammatic illustration of an example circuit breaker comprising a plurality of electronic devices, FIG. 2, a diagrammatic illustration of an example of a software pack according to a first embodiment, FIG. 3, a flowchart of an example embodiment of a generating method making it possible to generate the software pack of FIG. 2, FIG. 4, a flowchart of an example embodiment of an installation method according to a first embodiment, FIG. 5, a diagrammatic illustration of an example software pack according to a second embodiment, FIG. 6, a flowchart of an example embodiment of a generating method making it possible to generate the software pack of FIG. 5, and FIG. 7, a flowchart of an example embodiment of an installation method according to a first embodiment.

In FIG. 1, an electric circuit breaker 8 comprises a trip unit, not shown, and an electronic system 10. The trip unit is known in itself, and is not described in more detail.

The electronic system 10 comprises four electronic devices 12A, 12B, 12C, 12D, i.e., a first device 12A, a second device 12B, a third device 12C and a fourth device 12D, and a communication bus 13 connecting the electronic devices 12A, 12B, 12C, 12D to each other.

The electronic devices 12A, 12B, 12C, 12D are, for example, a man-machine interface, also denoted Front Display Module (FDM), a network interface device, for example an interface device with a Modbus network, also denoted Interface Modbus (IFM), an interface device with a trip unit of the circuit breaker 8, such as a Breaker Control Module (BCM) device, or a Breaker Status Control Module (BSCM) device. The electronic devices 12A, 12B, 12C, 12D are also, for example, a maintenance device, also denoted USB Tool Adapter (UTA) or Base Unit (BU) and an input/output device, also denoted Input/Output Module (I/O Module).

According to the example of FIG. 1, the first electronic device 12A is the maintenance device UTA, while the second electronic device 12B is a man-machine interface FDM, the third electronic device 12C is a network interface IFM and the fourth electronic device 12D is an interface device BCM with the trip unit of the electric circuit breaker 8.

The first electronic device 12A comprises a first module 14A for communicating with one or more electronic devices 12B, 12C, 12D of the assembly. The first electronic device 12A also comprises a first information processing unit 16A for example formed by a first memory 18A and a first processor 20A associated with the first memory 18A.

The second electronic device 12B, the third electronic device 12C and fourth electronic device 12D, respectively comprise the same elements as the first electronic device 12A previously described, each time replacing first by second, third, fourth, respectively, elements for which the references are obtained by replacing the letter A with the letter B, C, D, respectively. In FIG. 1, the elements contained in the fourth electronic device 12D have not been shown in order to simplify the drawings.

Each electronic device 12A, 12B, 12C, 12D comprises one or more hardware and/or software functions, not shown.

A hardware function refers to any function implemented by a hardware component, i.e., by an electronic component or a set of electronic components. Each electronic component is suitable for storing data, an input/output component, an interface component with the communication link, such as a serial link, a USB link, an Ethernet link, a Wi-Fi link or others. As an additional example, an electronic component is a programmable logic component, also called Field Programmable Gate Array (FPGA), or a dedicated integrated circuit, also called Application Specific Integrated Circuit (ASIC) or any other electronic component, programmable or not.

The software function refers to any function carried out by a software component, whether it involves firmware or software. A software function thus broadly refers to a set of software instructions able to carry out the software function when the software instructions are executed by a processor.

Hereinafter, the first electronic device 12A is more specifically considered, knowing that the description thereof also applies to the other electronic devices 12B, 12C, 12D.

The communication bus 13 is for example a wired bus, internal to the circuit breaker 8 and connecting the electronic devices 12A, 12B, 12C, 12D. The bus 13 is suitable for allowing an exchange of data between the electronic devices 12A, 12B, 12C, 12D. The communication modules 14A, 14B, 14C, 14D are then interfacing modules with the communication bus 13.

In an alternative that is not shown, the communication bus 13 forms a wireless data link, and the communication modules 14A, 14B, 14C, 14D are then wireless communication modules.

The first memory 18A is able to store a first public application authentication key C1 and a first hash function H1.

The first memory 18A is also able to store a public certificate authentication key C2 and a second hash function H2.

The public authentication key C2 of the certificate and the public application authentication key C1 are separate.

Desirably, the second hash function H2 is separate from the first hash function H1. This makes it possible to increase security during installation of an application.

For the case of the first electronic device 12A, the first processor 20A is able to execute a boot. In the event the first electronic device 12A supports multiple applications, a boot is able to isolate the application to be installed from the other applications already installed. This makes it possible to protect the first electronic device 12A if an application to be installed on the first electronic device 12A proves to be malware.

The boot executed by the first processor 20A is able to authenticate an application by using the public application authentication key C1.

The boot executed by the first processor 20A is also able to authenticate a certificate by using a public authentication key C2 of the certificate.

The boot executed by the first processor 20A is able to perform the installation of a software application. The boot executed by the first processor 20A is thus able to manage the installation of an application that is part of a software pack 100 as diagrammatically shown in FIG. 2.

The software pack 100 comprises an application 102, a certificate 104, a first firmware signature code FWSC for authenticating the application 102, and a second certificate signature code CSC for authenticating the certificate 104.

According to another alternative, the software pack 100 comprises a plurality of applications 102 and a first signature relative to certain specific applications 102. However, since this case involves an extension module, it is not described below.

Figure 2:
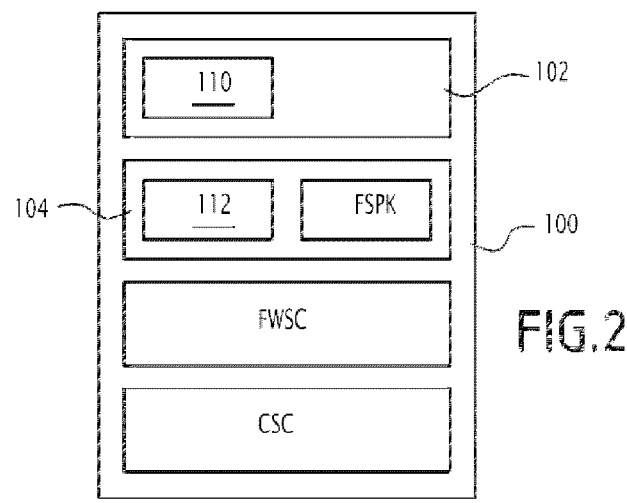

According to the example of FIG. 2, the application 102 is firmware.

Alternatively, the application 102 is an extension module (also referred to as an add-on or plug-in).

The application 102 comprises a data set. In the case illustrated by FIG. 2, the data of the application 102 is an execution file 110. The execution file 110 comprises all of the executable codes providing proper operation of the application 102.

In the case of FIG. 2, the data set of the application 102 is not encrypted. Alternatively, the data set of the application 102 is encrypted.

The certificate 104 also comprises a data set. In the case illustrated by FIG. 2, the data of the certificate 104 is the data 112 relative to the supplier of the software pack 100 and a first public key FSPK. The first public key FSPK makes it possible to decrypt the first signature FWSC.

In the case of FIG. 2, the data set of the certificate 104 is not encrypted. Alternatively, the data set of the certificate 104 is encrypted.

Figure 3:
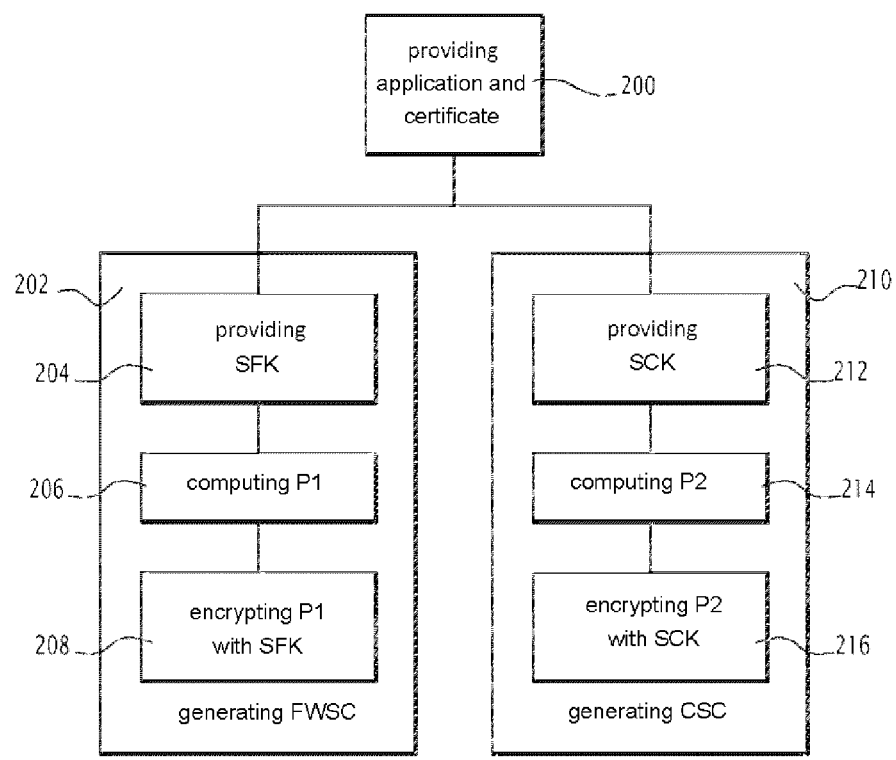

The first signature FWSC and the second signature CSC are generated similarly (asymmetrical encoding), but from separate private keys. To illustrate such a feature more specifically, reference is made to FIG. 3, showing a flowchart of one example embodiment of a method for generating the software pack 100.

The generating method comprises a step 200 for providing the application 102 and the certificate 104.

The generating method comprises a first generating step 202. In the first generating step 202, the first authentication signature FWSC of the application 102 is generated.

The first generating step 202 comprises a first provide sub-step 204, a first computation sub-step 206 and a first encryption sub-step 208.

In the first provide sub-step 204, a first private key SFK (Secret Firmware Key) is supplied.

In the first computation sub-step 206, the first hash function H1 is applied to the application 102 to obtain a first computation value P1.

In the first encryption sub-step 208, the first computation value P1 obtained at the end of the first computation sub-step 206 is encrypted using the first private key SFK supplied by a key management infrastructure.

The set of first computation 206 and encryption 208 sub-steps makes it possible to produce an asymmetrical encoding using the first private key SFK.

Thus, the first signature FWSC is obtained by asymmetrical encoding using the first private key SFK. As previously explained, the first signature FWSC can be decrypted by using the first public key FSPK, the first public key FSPK being associated with the first private key SFK.

The generating method comprises a second generating step 210. In the second generating step 210, the second signature CSC for authenticating the certificate 104 is generated.

Desirably, as is the case in the example of FIG. 3, in order to decrease the implementation time of the generating method, the two generating steps 202 and 210 are carried out simultaneously.

The second generating step 210 comprises a second provide sub-step 212, a second computation sub-step 214 and a second encryption sub-step 216.

In the second provide sub-step 212, a second private key SCK (Secret Certificate Key) is supplied.

In the second computation sub-step 214, the second hash function H2 is applied to the certificate 104 to obtain a second computation value P2.

In the second encryption sub-step 216, the second computation value P2 obtained at the end of the second computation sub-step 214 is encrypted using the second supplied private key SCK.

The set of the second computation 214 and encryption 216 sub-steps makes it possible to produce asymmetrical encoding using the second private key SCK.

Thus, the second signature CSC is obtained by asymmetrical encoding using the second private key SCK. A second public key FMPK associated with the second private key SCK makes it possible to decrypt the second signature CSC.

Figure 4:
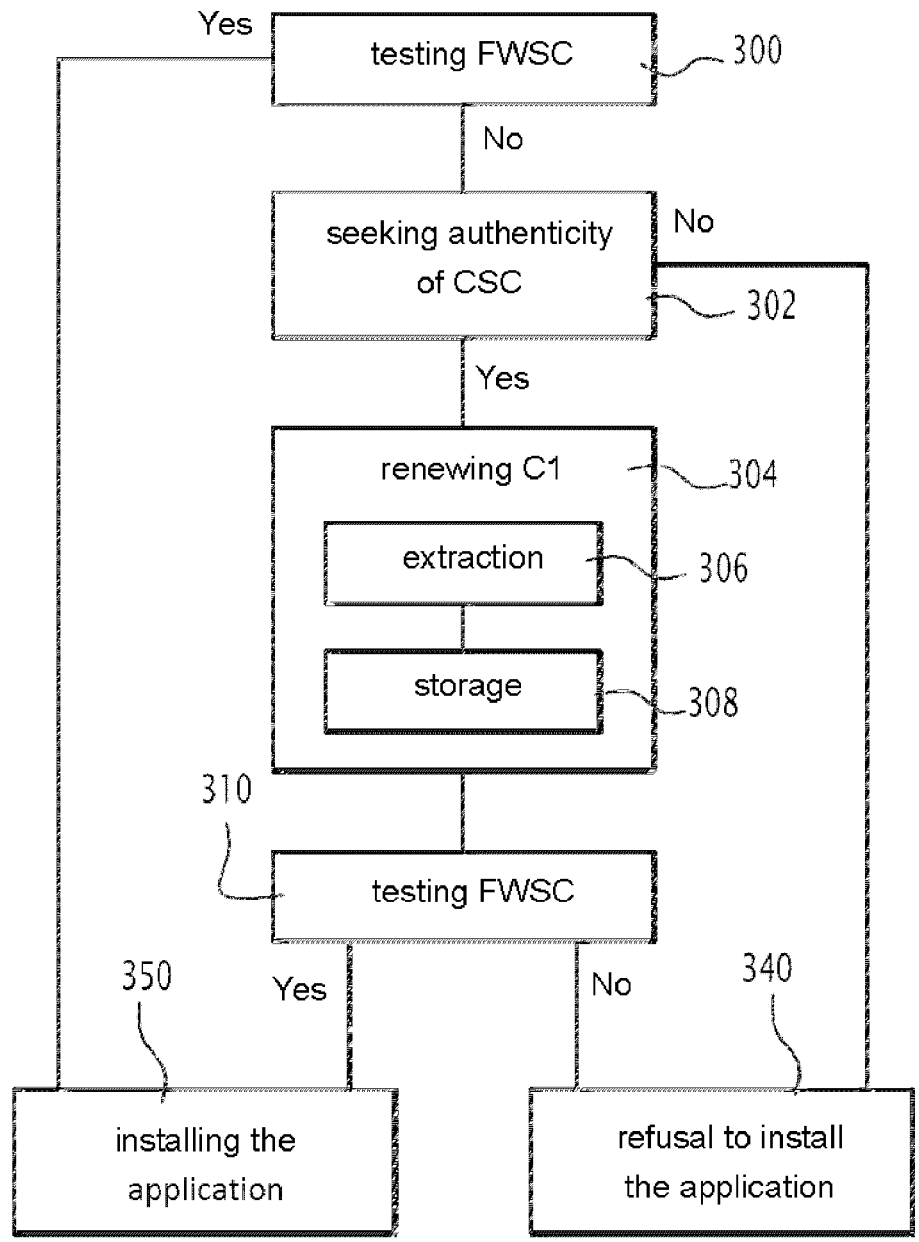

The operation of the first electronic device 12A in the case of the installation of the application 102 is described in reference to FIG. 4, which illustrates an example embodiment of a method for managing the installation of the application 102 on the first electronic device 12A.

Installation refers both to the addition of an application not present on the first electronic device 12A and the modification of an old version of the software application through an update.

The management method comprises a first step 300 for testing the first signature FWSC using the public application authentication key C1.

To authenticate the first signature FWSC, the first processor 20A of the first electronic device 12A extracts the first hash function H1 from the first memory 18A, then applies the first hash function H1 to the application 102. The first processor 20A thus obtains a first value V1.

The first processor 20A of the first electronic device 12A also extracts the public application authentication key C1 stored in the first memory 18A. Then, the first processor 20A decrypts the first signature FWSC using the public application authentication key C1. The first processor 20A thus obtains a second value V2.

It is possible to demonstrate that the first signature FWSC and the application 102 are authentic only if the first value V1 and the second value V2 are equal.

The first processor 20A of the first electronic device 12A therefore compares the first value V1 and the second value V2. If the two values V1, V2 are equal, the first processor 20A of the first electronic device 12A authenticates the first signature FWSC, while if the two values V1, V2 are different, the first processor 20A of the first electronic device 12A does not authenticate the first signature.

If the first signature FWSC is authenticated, the origin of the application 102 is assured and the management device next comprises a step 350 for installing the application 102.

Otherwise, this shows that the public key C1 for authenticating the application FSPK does not make it possible to authenticate the new application 102.

The management method then comprises a step 302 for seeking the authenticity of the second signature CSC using the second public authentication key C2 for the certificate.

The implementation of the search step 302 by the first processor 20A is similar to the implementation of the test step 300, and is therefore not specifically described below.

In the event the second signature CSC is not considered authentic during implementation of the search step 302, the certificate 104 is not authenticated. This means that the certificate 104 does not come from a safe source.

As a result, the method comprises a step 340 for refusing installation of the application 102 in order to protect the first electronic device 12A.

On the contrary, when the second signature CSC is considered authentic, the certificate 104 is authenticated. This shows that the public key C1 for authenticating the application no longer makes it possible to authenticate the new application 102, and more specifically the first signature FWSC.

The management method then comprises a step 304 for renewing the public application authentication key C1 of the first electronic device 10A.

The renewal step 304 comprises an extraction sub-step 306 and a storage sub-step 308.

In the extraction sub-step 306, the first public key FSPK contained in the data of the certificate 104 is read, then extracted. The extraction sub-step 306 is implemented by the first processor 20A.

During the storage sub-step 308, the first public key FSPK replaces the old public application authentication key C1.

The management process also comprises a second step 310 for testing the authenticity of the first signature FWSC using the new public application authentication key FSPK.

In the event the first signature FWSC is not considered authentic during implementation of the second test step 310, the application 102 is not authenticated. This means that the application 102 does not come from a safe source. As a result, step 340 for refusing installation of the application 102 in order to protect the first electronic device 12A is subsequently implemented.

On the contrary, once the first signature FWSC is considered authentic, the application 102 is authenticated. The step 350 for installing the application 102 is then implemented.

The management method then makes it possible to ensure that the entire software pack 100 has indeed been generated by an authorized company (an approved supplier or the manufacturer of the first electronic device 12A).

The management method also makes it possible to guarantee that the software pack 100 has not been modified by a third party.

The management method also makes it possible to renew the public application authentication key of the first electronic device 10A.

In such an embodiment, the second private key SCK remains the same throughout the entire lifetime of the first electronic device 12A. Such a condition is not very practical when the manufacturer of the first electronic device 12A is different from the supplier of the software pack 100.

For that reason, a second embodiment is also proposed allowing a change for the second private key SCK.

The second embodiment of the management method is described in reference to FIGS. 1, 5, 6 and 7.

The first electronic device 12A is identical in both embodiments.

Figure 5:
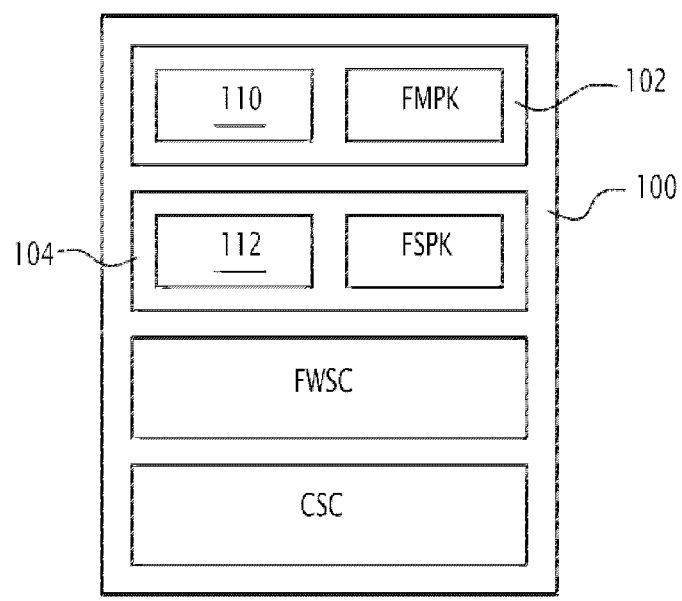

The similar elements between the software pack 100 according to the first embodiment and the software pack 100 according to the second embodiment illustrated by FIG. 5 are not repeated below. Only the differences are discussed.

In the case of FIG. 5, the application data 102 comprise, in addition to the execution file 110, the second public key FSPK.

Furthermore, the second signature CSC of the certificate 104 is no longer a single signature, but a set of two sub-signatures generically denoted CSCi, i referring to an integer greater than 1. In such a case, the second public key FSPK is a key making it possible to decrypt one of the second sub-signatures CSCi.

Figure 6:
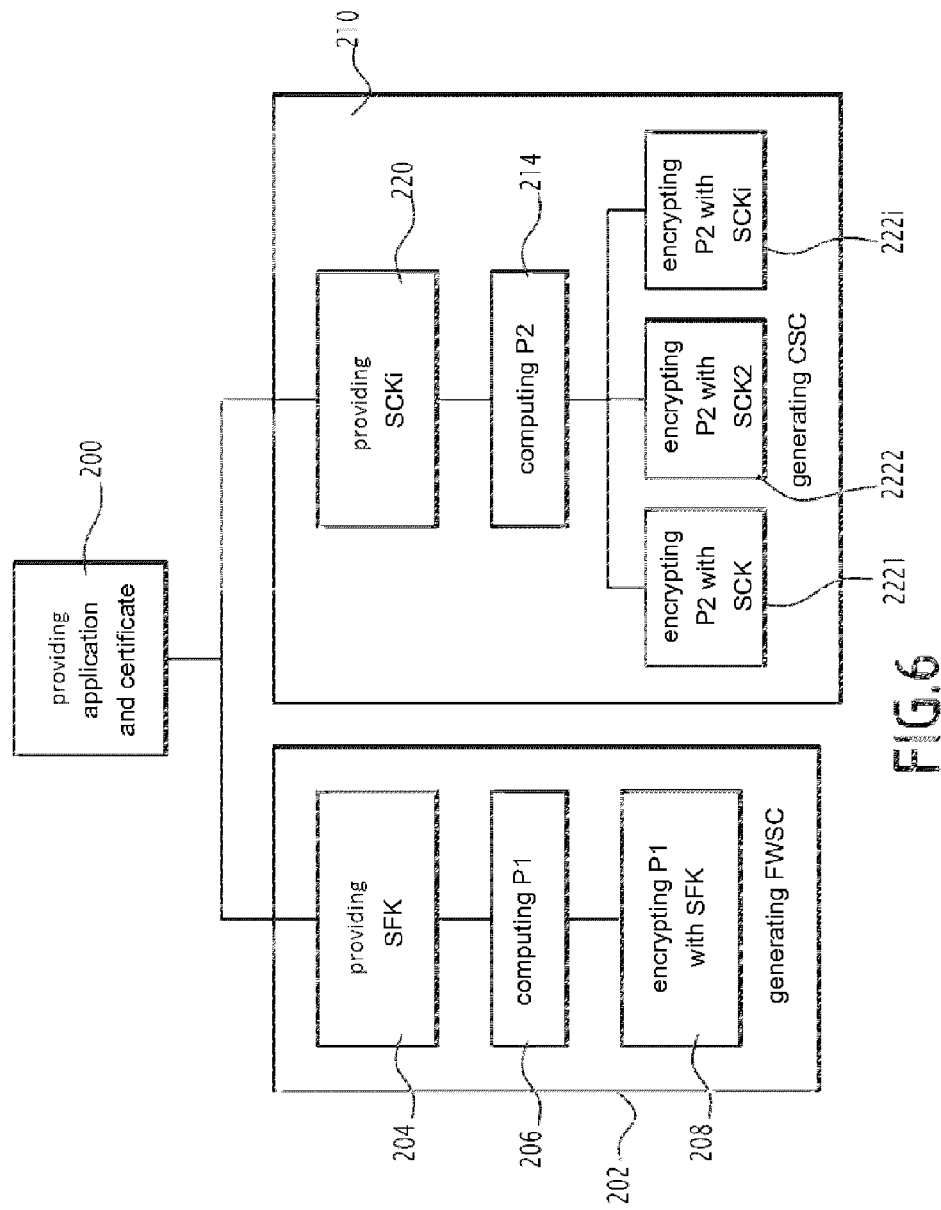

The generation of the second signature CSC is outlined in reference to FIG. 6, showing a flowchart of an example embodiment of a method for generating the software pack 100 according to the second embodiment. Only the second generating step 210 is described more specifically, the other steps remaining unchanged relative to the generating method described in reference to FIG. 3.

In the second generating step 210, the second signature CSC for authenticating the certificate 104 is generated.

The second generating step 210 comprises a sub-step 220 for providing a set of private encryption keys SCKi, i referring to an integer greater than 1.

The supplied private encryption keys SCKi correspond to the set of private keys SCKi that existed for the first electronic device 12A. This means that at least one of the second private encryption keys SCKi is associated with the public authentication key C2 of the certificate 104. Hereinafter, it is assumed that the second encryption key denoted SCK2 is associated with the public authentication key C2 of the certificate 104.

The second generating step 210 next comprises the computation sub-step 214, during which the second hash function H2 is applied to the certificate 104 to obtain the second computation value P2.

The second generating step 210 then comprises, for each second sub-signature CSCi, a sub-step 222i for decrypting the second computation value P2 using the respective supplied second private key SCKi to obtain the second sub-signature CSCi.

Each sub-step 222i is desirably carried out in parallel. This is shown diagrammatically in FIG. 6 by steps 2221, 2222 and 222i.

Thus, the second signature CSC is obtained by asymmetrical encoding using all of the second private keys SCKi. The second public FMPK associated with one of the second private keys SCK and the public key C2 for authenticating the certificate 104 make it possible to decrypt at least one of the second sub-signatures CSCi.

Desirably, the second sub-signatures CSCi are sequenced in a predefined order, generally from most recent to oldest, although other orders may be considered.

In one particular case, the second public key FMPK is associated with the most recent second private key SCKi.

According to another particular case corresponding to an old electronic device 12A, the second public key FMPK is associated with the oldest second private key SCKi.

Furthermore, according to one embodiment, each second private encryption key SCKi is separate from the first private encryption key SFK to guarantee optimal security.

Figure 7:
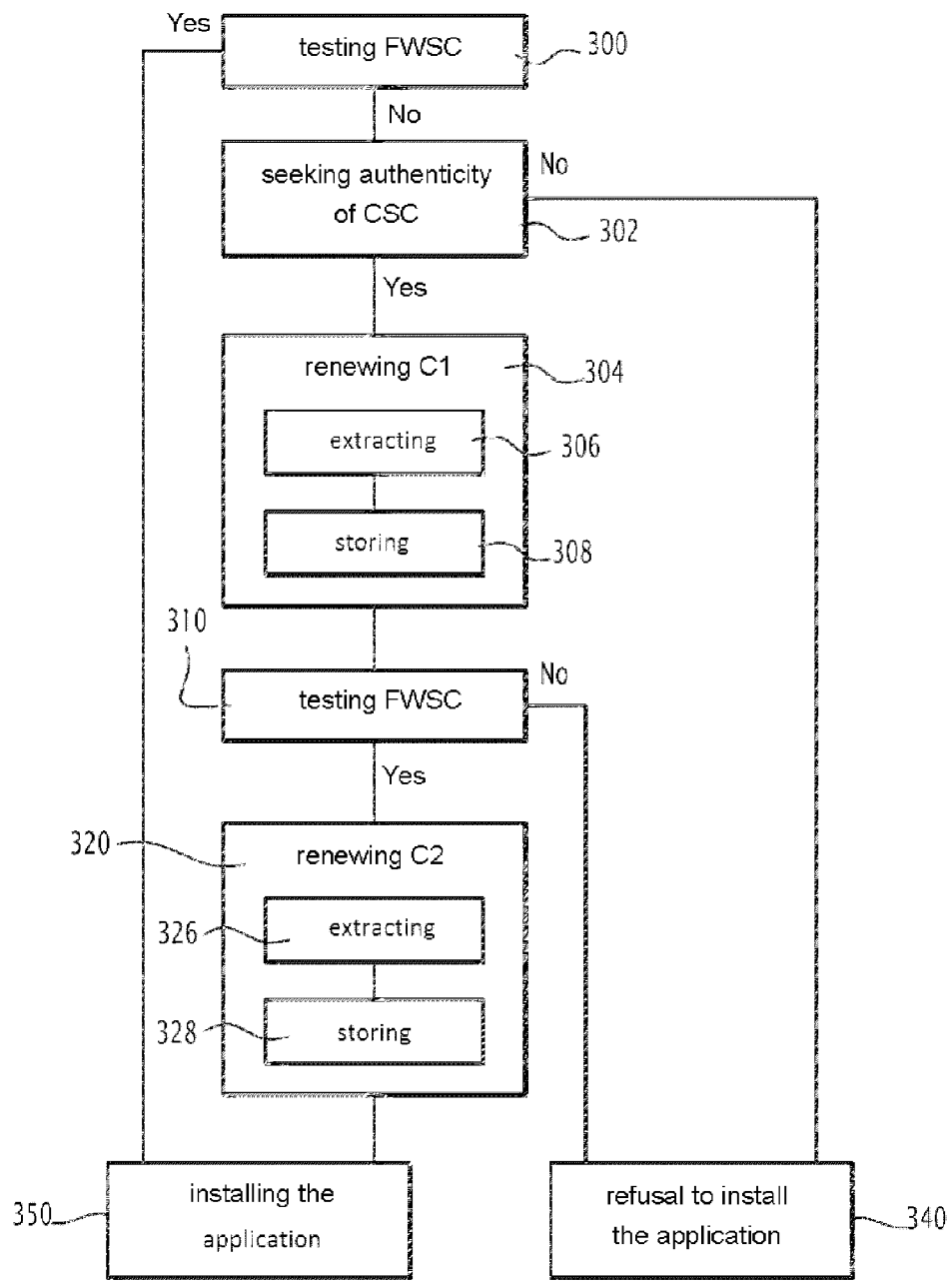

The management method is also modified in the second embodiment, as shown by FIG. 7.

The step 302 for seeking the authenticity of the second signature CSC using the public certificate authentication key C2 is different in the second embodiment.

In fact, in general, a plurality of second sub-signatures CSCi are tested successively until at least one second sub-signature CSCi is authenticated.

In the case at hand, for example, the second sub-signature CSC1 is dismissed, because it is considered non-authentic. The second sub-signature CSC2 is next tested and validated.

The second sub-signature CSC is not validated if none of the second sub-signatures CSCi can be validated.

Furthermore, according to the second embodiment, the management method then comprises a step 320 for renewing the public authentication key C2 of the certificate 104 of the first electronic device 12A.

The renewal step 320 comprises an extraction sub-step 326 and a storage sub-step 328.

In the extraction sub-step 326, the second public key FMPK contained in the application data 102 is read, then extracted. The extraction sub-step 326 is implemented by the first processor 20A.

During the storage sub-step 328, the second public key FMPK replaces the old public key C2 for authenticating the certificate 104.

Such storage makes it possible to authenticate future certificates.

The management method according to the second embodiment has the same advantages as the management method according to the first embodiment. Furthermore, the management method according to the second embodiment allows a more flexible use of the private keys, the private keys being able to vary during the lifecycle of the first electronic device 12A.

Furthermore, the management method is applicable to any type of electronic device that may be updated by installing a software application. Thus, although the management method has been illustrated for application to the first electronic device 12A, the management method also applies to the other electronic devices 12B, 12C and 12D.

Additionally, the first electronic device 12A may be part of systems other than a circuit breaker. In particular, the first electronic device 12A may be part of a programmable automaton, a variable speed drive, an inverter or an uninterruptible power provide of the UPS type.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of managing the installation of a software application on an electronic device comprising a memory in which a public application authentication key and a public certificate authentication key are stored, the software application being part of a software pack comprising:

the software application comprising at least one executable code portion, a first authentication signature of the software application, the first signature having been obtained by asymmetrical encoding using a first private encryption key, a certificate comprising encryption information, and a second authentication signature of the certificate, the second signature being a set comprising a plurality of second sub-signatures for authentication of the certificate, each of the second sub-signatures being obtained by asymmetrical encoding using a respective second private encryption key, at least one of the second private encryption keys being separate from the first private encryption key, the method comprising:

testing the first authentication signature using the public application authentication key, and installing the application when the first authentication signature is considered authentic, or when the first authentication signature is not considered authentic, the method further comprises at least:

seeking authenticity of the second authentication signature of the certificate using the public authentication key of the certificate, the certificate being authenticated if at least one of the second sub-signatures is considered authentic during implementation of the seeking, renewing the public application authentication key of the first electronic device when the second authentication signature of the certificate is considered authentic, and installing the application, when, using the new public application authentication key, the first authentication signature is considered authentic.

2. The management method according to claim 1, wherein at least one of the second private encryption keys is associated with the public authentication key of the certificate.

3. The management method according to claim 1, wherein the method further comprises renewing the public authentication key of the certificate of the electronic device.

4. The management method according to claim 3, wherein the encryption information of the certificate comprises a first public key associated with the first private encryption key and the software application comprises a second public key associated with a second private encryption key, the new public application authentication key obtained at the end of the renewal being the first public key and the new public authentication key of the certificate obtained at the end of the renewal being the second public key.

5. The management method according to claim 4, wherein the method further comprises authenticating the software application by verifying the authenticity of the first signature using the new public application authentication key.

6. The management method according to claim 4, wherein the electronic device comprises a processor configured to execute a boot-up process, the management method being implemented by the boot-up process.

7. The management method according to claim 1, wherein the installation of the software application is refused when at least one of the certificate and the software application is considered to be not authentic.

8. A method for generating a software pack, comprising:
providing, with a processor, an application comprising: at least one executable, a first private encryption key, a certificate comprising encryption information and at least one second private encryption key, at least one of the second private encryption keys being separate from the first private encryption key,
generating, with the processor, a first authentication signature of the application using asymmetrical encoding using the first private encryption key, and
generating, with the processor, a second authentication signature of the certificate, the second signature being a set comprising a plurality of second sub-signatures for authentication of the certificate, the generating the second signature comprising obtaining each second sub-signature by asymmetrical encoding using a respective second private encryption key,
wherein to install the at least one executable, the first authentication key is tested using the public application authentication key, and the at least one executable is installed when the first authentication signature is considered to be authentic, or
when the first authentication signature is not considered authentic, authenticity of the second authentication signature of the certificate is sought using the public authentication key of the certificate, the certificate being authenticated if at least one of the second sub-signatures is considered authentic during the seeking,
the public application authentication key of the first electronic device is renewed when the second authentication signature of the certificate is considered authentic, and
the at least one executable is installed, when, using the new public application authentication key, the first authentication signature is considered authentic.

9. A non-transitory computer-readable medium including computer-readable instructions that, when executed by a computer, cause the computer to perform the generating method according to claim 8.

10. An electronic device comprising:
a memory in which a public certificate authentication key and a public application authentication key are stored, the public authentication key of the certificate and the public application authentication key being stored separately in the memory so that each is separately accessible, and
a processor configured to perform:
testing of the first authentication signature using the public application authentication key, and
installing the application when the first authentication signature is considered authentic, or
when the first signature is not considered authentic, the processor is further configured to perform at least:
seeking authenticity of the second authentication signature of the certificate using the public key of the certificate, the certificate being authenticated if at least one of a plurality of second sub-signatures is considered authentic during implementation of the seeking,
renewing the public application authentication key of the electronic device when the second authentication signature of the certificate is considered authentic, and
installing the application, when, using the new public application authentication key, the first authentication signature is considered authentic.

* * * * *